United States Patent [19]
Huddleston, Jr.

[11] Patent Number: 5,824,983
[45] Date of Patent: Oct. 20, 1998

[54] WELD ASSEMBLY PURGE RESTRICTOR

[75] Inventor: Richard E. Huddleston, Jr., Austin, Tex.

[73] Assignee: Advanced Micro Devices, Inc.

[21] Appl. No.: 802,402

[22] Filed: Feb. 18, 1997

[51] Int. Cl.$^6$ .................................................. B23K 9/167
[52] U.S. Cl. .............................................. 219/61; 219/74
[58] Field of Search ...................... 219/61, 60 R, 219/60 A, 74, 75, 125.11

[56] References Cited

U.S. PATENT DOCUMENTS

| | | | |
|---|---|---|---|
| 2,747,065 | 5/1956 | Diehl | 219/61 |
| 3,536,879 | 10/1970 | Hartsell, Jr. et al. | 219/60 A |
| 3,614,378 | 10/1971 | Goodell et al. | 219/61 |
| 4,179,059 | 12/1979 | Chang et al. . | |
| 4,680,440 | 7/1987 | Barlet . | |
| 5,164,156 | 11/1992 | Yeo . | |
| 5,196,664 | 3/1993 | McGushion . | |
| 5,304,776 | 4/1994 | Buerkel et al. | 219/125.11 |

OTHER PUBLICATIONS

Patent Abstract for U.S. Patent No. 4,101,751, Urbanic, et al., Jul. 18, 1978.
Model 207 Arc Machines, Inc. Operator Training Manual: General Guidelines for Fusion Welding of Tube and Pipe, Effective: Aug. 1, 1986, Revised: Jul., 1991, pp. 4, 11, 22, 27–33, 35–37, 39–40, 46, 56–59, 74–77, and (i)–(iii).

Primary Examiner—Clifford C. Shaw
Attorney, Agent, or Firm—Kevin L. Daffer; Conley, Rose & Tayon

[57] ABSTRACT

Automatic orbital welding system for welding conduit sections. The system may include a weld head having a clamping assembly for aligning the conduit sections. The weld head may include an electrode for applying heat to the conduit sections. Inert purge gas is preferably passed through the conduit sections while the orbital weld is formed to exclude contaminants from the weld area. A purge assembly is preferably connected to one of the conduit sections. The purge assembly preferably includes a purge restrictor having a valve disposed therein to allow the pressure within the conduit sections to be precisely controlled within a predetermined range during welding to promote the formation of a suitable weld.

30 Claims, 4 Drawing Sheets

WELD ASSEMBLY PURGE RESTRICTOR

BACKGROUND OF THE INVENTION

1. Field of the Invention

The present invention generally relates to automatic orbital welding devices. More particularly, an embodiment of the invention relates to a purge assembly for maintaining a selected pressure of purge gas within a conduit that is being arc welded with an automatic orbital welding device.

2. Description of the Related Art

Some conventional arc welding processes employ an electrode to create an electrical potential proximate the metal components to be welded. In such processes, an electric arc formed by the electric potential is used to heat portions of the metal components, thereby transforming the components into a molten state to allow them to be fused together. In some processes (e.g., metal inert gas welding or "MIG"), the electric potential is generated by a consumable electrode (e.g., carbon electrode) that is continuously melted by the arc to become part of a weld puddle formed at the interface of the metal components to be joined. In other processes, (e.g., tungsten inert gas type or "TIG"), the electric potential is generated by a non-consumable electrode (e.g., tungsten electrode).

During the welding process, the molten metals tend to oxidize upon exposure to air or moisture, resulting in an unsuitable weld. The presence of air, moisture, hydrocarbons, or other contaminants proximate the electric arc also may reduce the life of the electrode and/or destablize the arc. A shielding gas such as argon or helium may be distributed about the arc to purge the weld area of air and moisture that might contaminate the weld.

A number of orbital welding methods well known in the art may be used to join components having circular-shaped tubular ends. U.S. Pat. No. 5,196,664 to McGushion relates to an orbital welder for creating high purity welds that includes a welding head and a hinged clamp arrangement for holding tubes in abutment so that they may be welded together. Shielding gas is discharged from the clamp arrangement into the welding region to protect the molten metal and arc from contaminants. U.S. Pat. No. 4,179,059 to Chang et al. and U.S. Pat. No. 4,680,440 to Barlet also relate to welding methods employing shielding gas arrangements. Each of the above-mentioned patents is incorporated by reference as if fully set forth herein.

In one orbital welding method, a first pipe section and a second pipe section are aligned end to end and secured in a weld head. It has been found that flowing inert gas through the conduit sections to be welded provides additional protection against contamination of the weld. Purge gas may be introduced into an end of the first pipe section and passed across the weld area at the interface of the first pipe section and the second pipe section. The purge gas exits the pipe sections through an end of the second pipe section. The purge gas maintains a pressure within the pipe sections to exclude contaminants such as nitrogen and oxygen from the area proximate the weld. Maintaining a precise pressure within the pipe sections tends to be difficult. Frequently, the resulting weld is concave if the pressure within the pipe sections proximate the weld area is too high, or convex if the pressure within the pipe sections proximate the weld area is too low. In addition, if the purge gas is released into the atmosphere from a location in the vicinity of the weld area, "backstreaming" or diffusion of gas from the atmosphere into the second pipe section may occur. Contaminants that "backstream" from the atmosphere into the second pipe section may contaminate the weld, particularly when the length of the second pipe section is relatively short.

It is therefore desirable that an improved orbital welding system be derived that is capable of maintaining a precisely controlled amount of purge gas within the pipe sections to maintain a selected pressure of purge gas proximate the weld area.

SUMMARY OF THE INVENTION

In accordance with the present invention, an orbital welding system including a purge assembly is provided that largely eliminates or reduces the aforementioned disadvantages of conventional orbital welding systems. An embodiment of the invention relates to an automatic orbital weld system that includes a weld head, a purge gas supply system, and a purge restrictor. The weld head includes a clamp assembly for positioning a pair of conduit sections in abutment for welding and a heat source for applying heat to the conduit sections to weld them together. The purge gas supply system is connected to one of the conduit sections and capable of passing purge gas through the conduit sections during welding to reduce or eliminate the presence of contaminants where the orbital weld is formed. The purge restrictor may be connected to one of the conduit sections to restrict the flow of the purge gas through the sections to allow the pressure proximate the weld area to be maintained within a predetermined range.

The purge restrictor may include a sealing end for attachment to one of the conduit sections. The sealing end of the purge assembly and the conduit to be welded are preferably constructed of the same material to prevent contamination of the conduit. The sealing end and the conduit may each be constructed of stainless steel. The inner surface of the sealing end preferably forms a slip-fit engagement with the outer surface of one of the conduit sections to be welded. The frictional engagement between the sealing end and the conduit section is preferably sufficiently tight that the presence of a gasket or other sealing device that might leave a residue on the conduit section is unnecessary.

The orbital welding system may also contain an elongated outflow conduit connected to the purge restrictor. The outflow conduit directs the flow of purge gas from the purge restrictor. The outflow conduit preferably has a sufficient length to prevent the backflow of contaminants from the atmosphere to a location proximate the weld. The outflow conduit may have a length that is greater than about six inches.

The purge gas may be introduced into the conduit section at a flow rate between about 5 cubic feet per hour and about 15 cubic feet per hour. A predetermined pressure is preferably maintained within the conduit sections during welding to allow the formation of a suitable weld that is not concave or convex. A valve may be disposed within the purge assembly to allow the flow of purge gas to be selectively restricted to precisely control the pressure within the conduit sections. In an embodiment, the valve is adjusted to maintain a pressure head that is between about 1 inch of water and about 5 inches of water. The valve is preferably a needle valve located within a reducing section of the purge restrictor that has a smaller diameter than that of the sealing end. A pressure measurement device is used to measure the pressure within the conduit sections, and the valve may be continually adjusted during welding as a function of the pressure indicated by the pressure measurement device. The valve may be operated manually or the purge assembly may further include an automatic control system for (a) determining the pressure proximate the weld area and (a) regulating the purge gas pressure by adjusting the valve as a function of the determined pressure.

The present invention is applicable to a variety of orbital welding techniques and has been found to be particularly useful in combination with TIG welding methods. In an embodiment, the weld head heat source is a tungsten electrode and the purge gas is argon gas.

The formed orbital weld is preferably fully penetrated and not substantially concave, convex, or discolored. The weld preferably has a maximum radial length of misalignment, concavity, or convexity that is less than about 10 percent of the wall thickness of the welded conduit. The inside beam width and outside beam width of the formed weld are preferably equal.

Accordingly, an advantage of the invention relates to maintaining a predetermined pressure of inert gas proximate a weld area while an orbital weld joint is formed to reduce or eliminate the presence of contaminants in the weld area and to cause the resulting orbital weld to be substantially flat.

Another advantage relates to inhibiting back diffusion of weld contaminants to a location proximate a weld.

Still another advantage of the invention relates to a purge assembly for removable attachment to a component to be welded whereby the purge assembly transfers no residue or contaminants to the component.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
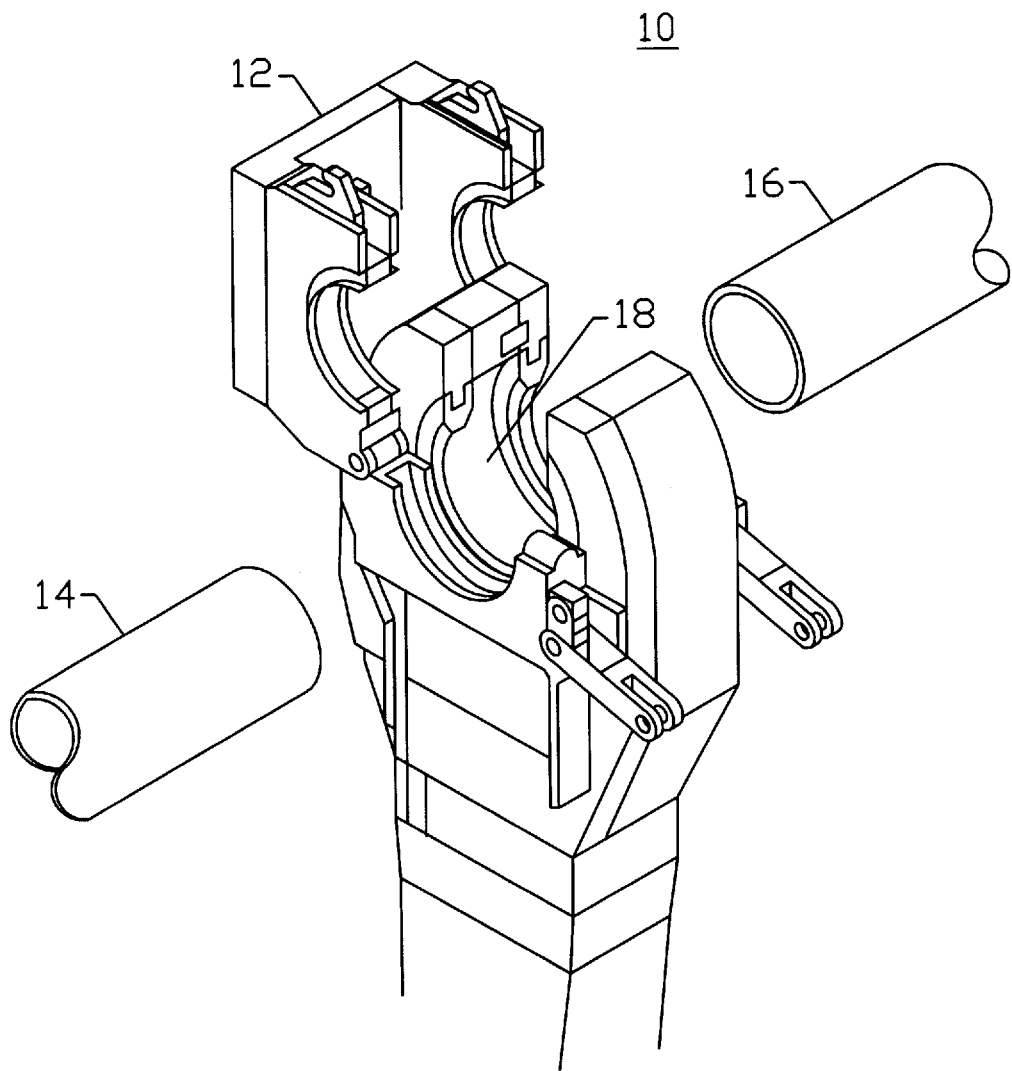
FIG. 1 depicts a conventional automatic orbital weld head having a clamp assembly for positioning weldable conduit sections.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A weld head assembly 10 for automatic orbital welding of conduits is depicted in FIG. 1. For the purpose of this description, "conduit" is taken to mean a weldable section including but not limited to a fitting or section of pipe or tubing. The weld head assembly may be used for fusion welds of tube-to-tube, tube-to-fitting, pipe-to-pipe, pipe-to-fitting, and other applications in which weldable components having circular-shaped tubular ends are to be joined. The weld head assembly exemplified in FIG. 1 contains a clamp assembly 12 for securing a first conduit section 14 and a second conduit section 16 within an access opening in the weld head. The area in the vicinity of the interface between the first and second conduit sections where the orbital weld is to be formed is referred to herein as the "weld area." The clamp assembly also may serve to create an enclosed chamber about the weld area to contain (a) shield gas distributed from the weld head and/or (b) purge gas that escapes from the interior of the conduit sections through the interface between the conduit sections.

The weld head preferably contains a rotor 18 having a heat source disposed thereon. The heat source is preferably an electrode capable of creating an electric potential proximate the conduit sections to heat the conduit sections to allow the formation of a weld. The electrode may be a consumable electrode adapted for use in a MIG process or a non-consumable electrode such as a tungsten electrode for use in a TIG process. The heat source may instead be a torch for applying a flame to the interface of the first and second conduit sections. The rotor preferably rotates about the circumference of the first and second conduit sections such that the heat source moves along the interface of the first and second conduit sections to form the weld. A shielding gas such as argon may be distributed from the weld head to the weld area and about the heat source during welding to exclude contaminants from the weld area and heat source.

The use of weld heads for automatic orbital welding is well known to those skilled in the art. It is to be understood that a number of orbital weld heads are suitable for use in accordance with the present invention. A series of weld heads that has been found to perform adequately is the Model 9 Weld Head (e.g., Model 9-500 Mini Head, Standard Model 9, Model 9AF, and Model 9E), commercially available from Arc Machines, Inc. located in Pocima, Calif. The operator training manual entitled "AMI General Guidelines for Fusion Welding" and available from Arc Machines, Inc. is incorporated by reference as if fully set forth herein.

Figure 2:
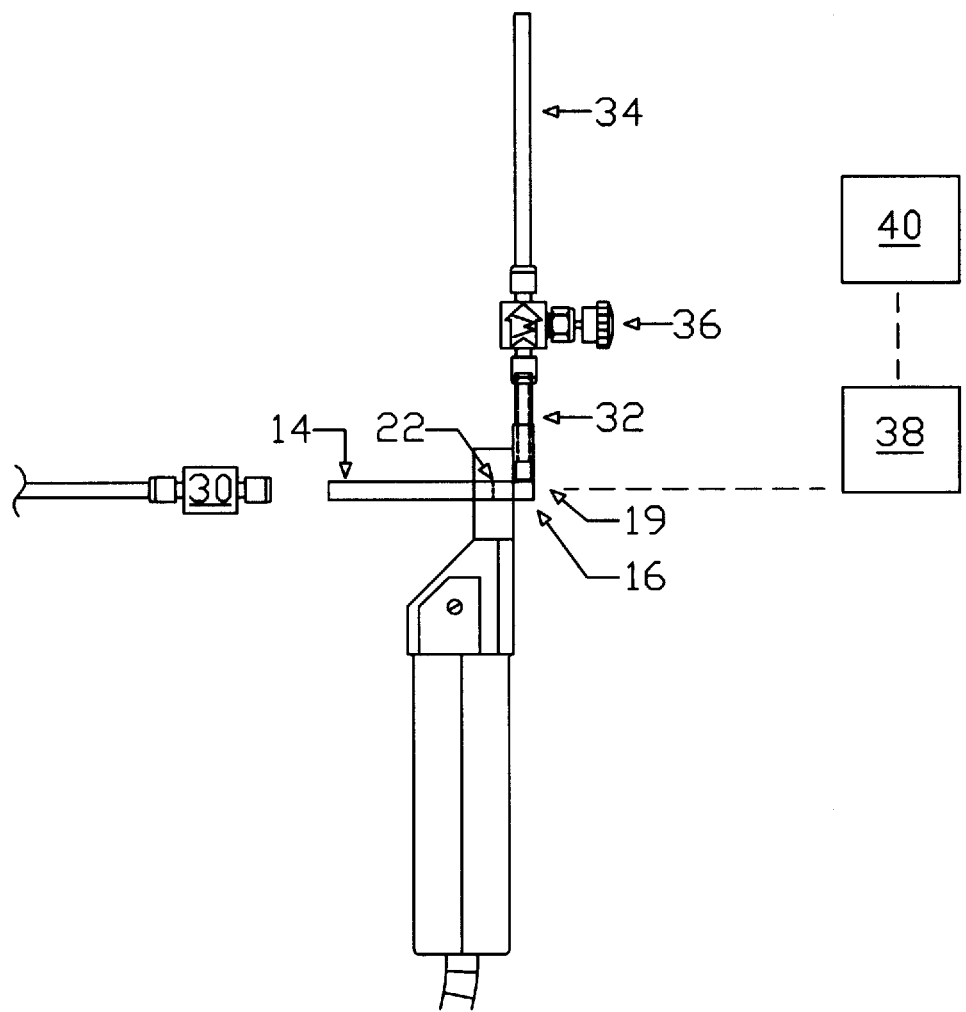
FIG. 2 depicts an automatic orbital welding system containing a purge assembly constructed in accordance with the present invention.

In an embodiment of the invention, conduit sections 14 and 16 are aligned in abutment within weld head 10, and the weld area is purged during formation of the weld by introducing a purge gas into conduit section 14 and passing the purge gas through conduit sections 14 and 16. An orbital weld system in accordance with the present invention is depicted in FIG. 2. The system preferably includes purge gas supply system 30, automatic orbital welding head 10, and purge assembly 19. Purge assembly 19 may include purge restrictor 32, outflow conduit 34, valve 36, and pressure measurement device 38. Purge gas may be supplied to conduit section 14 from purge gas supply system 30. The purge gas supply line may be connected to conduit section 14 via a compression fitting (not shown) to form a substantially airtight seal. The purge gas is preferably an inert gas such as argon, helium, a combination thereof, or other suitable gases. The purge gas is preferably free of oxygen, water, nitrogen, hydrocarbons, and other contaminants. In an embodiment, the purge gas is greater than 99.99% pure. The purge gas passed into the conduit section preferably creates a predetermined pressure within the conduit sections proximate the weld area to exclude oxygen, moisture, nitrogen, hydrocarbons, and other contaminants from the weld area. Such contaminants have a tendency to promote the formation of oxides in the weld and discolor the weld, resulting in a poor and/or unsuitable weld. Purge gas is preferably continually passed through the conduit sections during welding to remove any gases from the weld are that are generated during the formation of the orbital weld.

Figure 3:
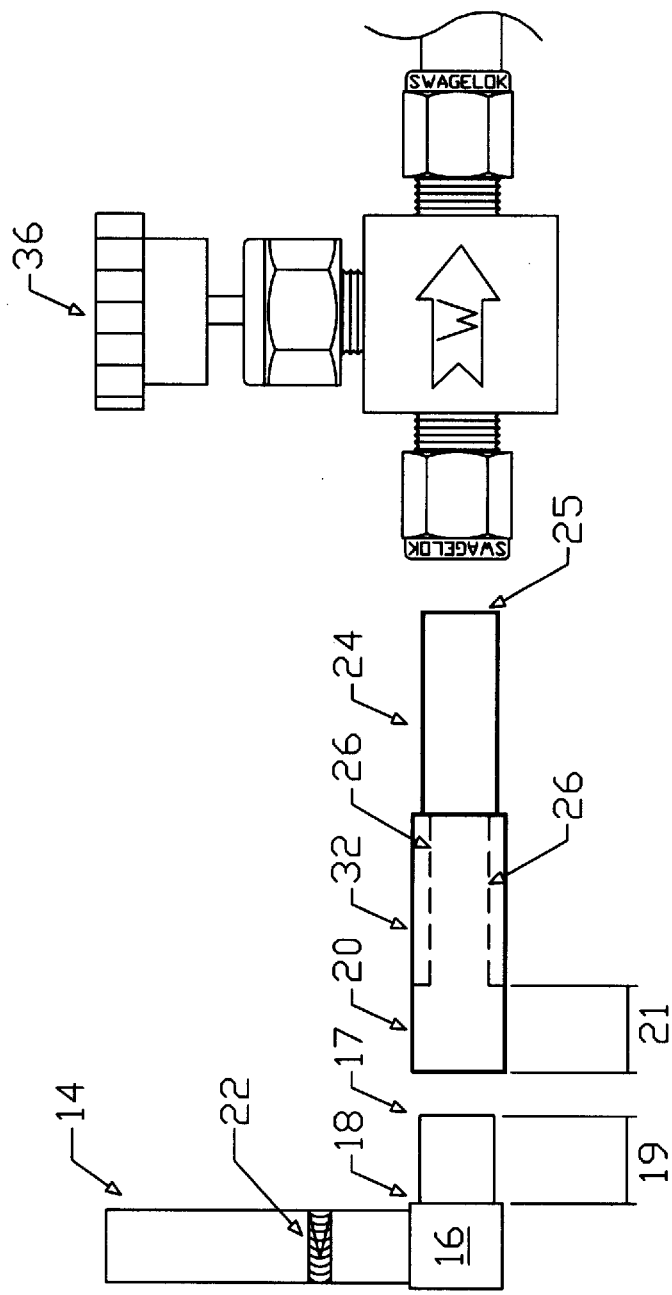
FIG. 3 depicts a purge restrictor of the present invention for attachment to a weldable conduit section.

A purge restrictor 32 for restricting the flow of purge gas through the conduit sections is depicted in FIG. 3. The purge restrictor is preferably connected to an end 17 of conduit section 16. In FIG. 3, conduit section 16 is a microfit fitting connected to a section of tubing 14 by orbital weld 22. The purge restrictor preferably includes a sealing end 20 for attachment to conduit section 16. The sealing end and conduit section 16 are preferably constructed of the same material to prevent contamination of conduit section 16. Attempts have been made to restrict the flow of purge gas through the conduit sections by partially covering the end 17 with tape or a plastic end cap containing an opening. It has been found, however, that such devices tend to leave a residue on the second section after the weld has been formed. Heat is typically conducted to the purge restrictor during the formation of the weld, which may cause material (e.g., plastic) to adhere to the outer surface of the second section. The material may contaminate a site on conduit section 16 that will be located within the weld area if the end of conduit section 16 is later welded. In an embodiment, both the sealing end and conduit section 16 are made of stainless steel. It is to be understood that the purge restrictor may be made of a number of other metals depending upon the specific application and the nature of the material of construction of conduit section 16.

Although the present invention is applicable to a wide range of orbital welding applications, it has been found to be particularly useful for welding conduits designed to contain ultra high purity gases (e.g., argon, oxygen, helium, hydrogen) such as those used in the manufacturing of semiconductor chips. Such conduits may have a diameter between about one-half inch and about one-quarter inch. Such conduits also may have electropolished surfaces that will be damaged if the conduit is bent. Therefore, weldable fittings (e.g., elbows) such as the one illustrated in FIG. 3 are typically used to create angles between straight sections of pipe or tubing when it is desired that the sections not be bent.

The sealing end 20 preferably has a diameter that is slightly larger than the outside diameter of the end of conduit section 16 to which it is connected. The sealing end preferably forms a "slip-fit" engagement with the end of conduit section 16. The diameter of the sealing end may be precisely controlled during its manufacture such that the relatively low tolerance between the sealing end and conduit section 16 allows the formation of an adequate seal without the use of a gasket. It is preferred that no more than a slight amount of purge gas escapes to the atmosphere through the connection between conduit section 16 and the sealing end. In an embodiment, the sealing end has a diameter that exceeds the diameter of the end 17 of conduit section 16 by less than about 4 mils, more preferably less than about 2 mils, and more preferably still about 1 mil or less. When conduit section 16 is an elbow fitting (as shown in FIG. 3), sealing end 20 preferably forms a shoulder having a length 21 that is approximately equal to or greater than length 19 of end 17 of the fitting. The shoulder preferably surrounds end 17 and engages the base 18 of the fitting.

In an embodiment of the invention, the purge restrictor contains a reducing section 24 having a smaller diameter than that of the second conduit section 16. The flow of purge gas through the conduit sections is preferably restricted at the reducing section to allow a precise pressure of purge gas to be maintained within the conduit sections while the orbital weld is formed. The reducing section may begin at a location proximate the sealing end and terminate in a reducing end 25 through which the purge gas exits the purge restrictor.

The purge restrictor may contain a tapered section between the sealing end and the reducing section whereby the diameter of the purge restrictor gradually narrows in the direction of the reducing end. Alternately, a substantial stepwise change in the diameter of the purge restrictor may occur adjacent to the reducing section as shown in FIG. 3.

In an embodiment of the invention, the purge restrictor includes a body formed from two conduits that are preferably concentric. The outer conduit may have a diameter that is about equal to that of the sealing end. The inner conduit preferably communicates with the sealing end and has a diameter that is smaller than that of the outer conduit so that the flow of purge gas is restricted as it passes from the sealing end into the inner conduit. The ratio of the diameter of the outer conduit to that of the inner conduit is preferably greater than about 1:1.2, more preferably between about 1:1.2 and about 1:5, and more preferably still between about 1:1.5 and about 1:3. A solid filler 26 may be disposed between the outer conduit and the inner conduit.

In an embodiment of the invention, the reducing section is connected to an outflow conduit 34 that directs the purge gas away from the purge restrictor. The outflow conduit is preferably a substantially flexible conduit. In an embodiment, the outflow conduit is made of stainless steel and contains corrugations that allow it to bend.

The purge restrictor preferably facilitates the maintenance of a pressure within a predetermined range within the conduit sections during welding. The predetermined pressure range may vary depending on the application. If the pressure of purge gas within the first and second conduit sections falls outside of a selected range, then the resulting orbital weld will tend to be unsuitable. For instance, if the pressure within the conduit sections is too great, then the inner surface of the weld tends to be concave. If the pressure within the conduit section is too low, then the inner surface of the weld tends to be convex. In an embodiment, the pressure within the conduit sections is maintained greater than about 1 inch of water, more preferably between about 1 inch of water and about 10 inches of water, and more preferably still between about 1 inch of water and about 5 inches of water.

In an embodiment of the invention, the pressure of purge gas within the conduit sections is controlled by passing the purge gas through a valve 36 located within the purge assembly. The valve is preferably located within the purge restrictor, and more preferably within the reducing section. The valve is preferably a needle valve, however it is to be understood that a number of other types of valves may perform adequately. The use of a needle valve tends to allow relatively fine adjustment for precisely controlling the pressure proximate the weld area. The valve may be operated manually by observing the pressure sensed by pressure measurement device 38 and adjusting the valve until the sensed pressure falls within a selected range. Pressure measurement device 38 may be any suitable pressure measurement device (e.g., manometer) capable of determining the pressure proximate the weld area. A magnahelic has been found to perform particularly well as the pressure measurement device in embodiments of the present invention. The general use of such pressure measurement devices is well known to those skilled in the art.

Alternately, the valve may be controlled by an automatic controller 40. Controller 40 may adjust the degree to which the valve is opened as a function of the flow rate of purge gas introduced into conduit section 14. The flow rate of inert gas may be between about 5 cubic feet per hour and about 15 cubic feet per hour for relatively small conduit sections (i.e., those having a diameter less than about 1 inch). The controller preferably continuously monitors the pressure within the conduit sections and adjusts the valve as a function of the sensed pressure. For instance, the automatic controller is preferably adapted to open the valve by a selected amount when the sensed pressure within the conduit sections rises above a preselected pressure range and close the valve by a selected amount when the sensed pressure within the conduit sections falls below the preselected pressure range. The general use of automatic controllers is well known to those skilled in the art.

It has been found that "backstreaming" of contaminants into the weld zone may occur when the length of the second section is relatively small. "Backstreaming" is taken to mean diffusion of contaminants from the atmosphere outside of the conduit sections into the end of the second conduit section 16 and to a location proximate the weld area. "Backstreaming" may be especially problematic when a pipe-to-fitting or tube-to-fitting orbital weld is formed whereby the purge gas passes directly from the fitting into the atmosphere. The purge assembly is preferably elongated to prevent the "backstreaming" or diffusion of contaminants into the weld area. The purge assembly is preferably sufficiently long to prevent substantial "backstreaming" of contaminants into second conduit section 16. In an embodiment, the purge restrictor has a length of between about 1.5 and about 3 inches. The outflow conduit preferably has a length greater than about 3 inches, more preferably between about 3 inches and about 6 inches, and more preferably still at least about 6 inches.

Figure 4:
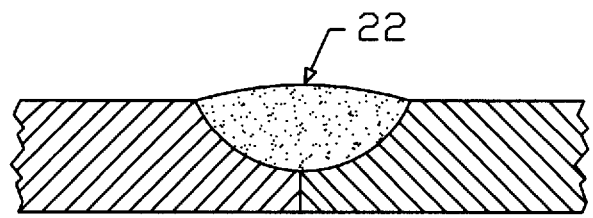
FIG. 4 illustrates an under-penetrated orbital weld.
Figure 5:
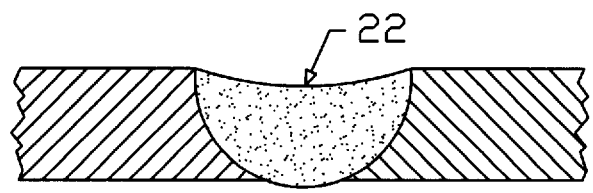
FIG. 5 illustrates an over-penetrated orbital weld.
Figure 6:
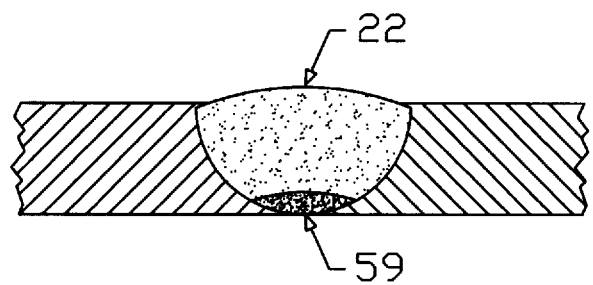
FIG. 6 illustrates a contaminated orbital weld.
Figure 7:
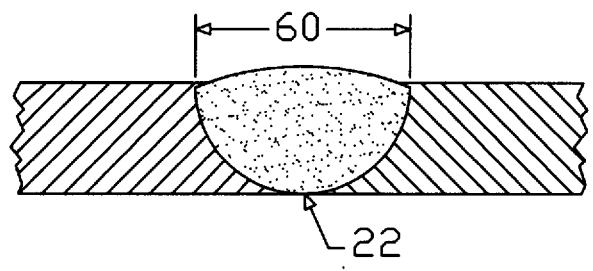
FIG. 7 illustrates a properly formed orbital weld.

FIGS. 4–7 depict the wall of a conduit proximate a formed orbital weld. The purge restrictor preferably allows the formation of an orbital weld that is non-contaminated and fully penetrated such that the orbital weld is not concave or convex with respect to the surface of the welded conduit. A weld lacking penetration is depicted in FIG. 4. The under-penetrated weld depicted in FIG. 4 does not fully extend across the interface of the welded conduit sections. An over-penetrated weld is depicted in FIG. 5. The over-penetrated weld is convex on the inside diameter and concave on the outer diameter. If the purge gas flow rate is insufficient, then the weld may become contaminated and discolored as illustrated by portion 59 in FIG. 6. A properly formed weld is illustrated in FIG. 7. The properly-formed weld is fully penetrated such that the weld is not concave or convex relative to the surrounding surface of the welded conduit. The orbital weld preferably has a bead width 60 that is substantially equal on the interior surface of the conduit and on the outer surface of the conduit. The formed orbital weld preferably has a maximum concavity, convexity, or misalignment that is less than about 15 percent of the conduit wall thickness, more preferably less than about 10 percent of the conduit wall thickness, and more preferably still less than about 5 percent of the conduit wall thickness.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An automatic orbital weld system, comprising:
   a weld head for holding a conduit during welding, the weld head comprising a heat source for applying heat to the conduit, the conduit comprising a first section and a second section;
   a purge gas supply system, the purge gas supply system being connected to the first section and adapted to introduce purge gas into the conduit;
   a purge assembly for regulating the flow of purge gas through the conduit, the purge assembly being substantially elongated and configured for connection to the conduit to inhibit backstreaming of atmosphere into the conduit during welding; and
   a purge restrictor comprised in the purge assembly for maintaining the purge gas within the conduit at a pressure within a predetermined pressure range, the purge restrictor comprising a sealing end and a reducing section, the sealing end being dimensioned such that it is capable of connection to the second section by a slip-fit engagement without a gasket, the reducing section having a smaller diameter than that of the sealing end.

2. The system of claim 1 wherein the predetermined pressure range is between about 1 inch of water and about 5 inches of water.

3. The system of claim 1 wherein the purge assembly has a length of at least about six inches.

4. The system of claim 1 wherein the heat source is a tungsten electrode, and wherein the purge gas supply system comprises argon gas.

5. The system of claim 1 wherein the sealing end and the conduit are made of an identical material so as to inhibit contamination of an end of the conduit.

6. The system of claim 1 wherein the sealing end and the conduit are each constructed of stainless steel.

7. The system of claim 1 wherein the purge assembly further comprises a needle valve for regulating the pressure within the conduit during use.

8. The system of claim 1, further comprising a magnahelic for monitoring the pressure within the conduit during use.

9. The system of claim 1 wherein the sealing end comprises a first diameter and the second section comprises a second diameter, the first diameter being greater than the second diameter by an amount between about 1 mil and about 6 mil.

10. The system of claim 1 wherein the sealing end comprises a first diameter and wherein the second section comprises a second diameter, the first diameter being greater than the second diameter by an amount between about 1 mil and about 3 mil.

11. The system of claim 1 wherein the purge assembly further comprises an outflow conduit that is corrugated and substantially flexible.

12. The system of claim 1 wherein the sealing end comprises an inner surface and the second section comprises an outer surface, and wherein the sealing end is connected to the second section solely through a frictional engagement between the inner surface of the sealing end and the outer surface of the second section, and wherein the inner surface of the sealing end comprises a metal to prevent contamination of the second section.

13. The system of claim 1 wherein the purge assembly further comprises a needle valve located within the reducing section, and further comprising an automatic control system, the automatic control system being adapted to adjust the needle valve, wherein adjusting the needle valve comprises partially opening the needle valve by a selected amount, the selected amount being determined as a function of a flow rate of the purge gas introduced into the conduit, and wherein the automatic control system is configured to adjust the needle valve to maintain a selected pressure of the purge gas within the conduit that is greater than atmospheric pressure throughout formation of a weld.

14. The system of claim 1 wherein the sealing end is dimensioned such that a substantially airtight seal is formed between the sealing end and the second conduit section.

15. The system of claim 1 wherein the sealing end comprises a diameter, and wherein the sealing end is tapered such that the diameter decreases in a direction toward the reducing section so that the sealing end is attachable to conduits having a range of diameters.

16. The system of claim 1 wherein the sealing end comprises a diameter that varies along a length of the purge restrictor to allow the sealing end to form a connection with conduits having a range of diameters.

17. The system of claim 1 wherein the second conduit section is an elbow comprising a base and an end, the end extending from the base and having a diameter less than that of the base, and wherein the purge restrictor comprises an inner surface having a fill section located thereon that reduces a diameter of the purge restrictor, and wherein the sealing end and the elbow end are capable of being assembled such that the sealing end substantially surrounds the elbow end and contacts the base while the elbow end is substantially flush with the fill section.

18. The system of claim 1 wherein the weld head forms a substantially enclosed chamber about an interface of the first conduit section and the second conduit section, the chamber being configured to contain purge gas that escapes from the first and second conduit sections, the weld head being capable of distributing shield gas proximate the interface.

19. A method of creating an orbital weld between conduit sections, comprising:

aligning a first conduit section and a second conduit section in a weld head, the weld head comprising a heat source for welding the conduit sections together, the weld head forming a substantially enclosed chamber about an interface of the first conduit section and the second conduit section, the chamber being configured to substantially contain gas that escapes from the first and second conduit sections, the weld head being capable of distributing shield gas proximate the interface;

transferring heat from the heat source to the conduit sections to create an orbital weld between the first conduit section and the second conduit section to form a conduit;

introducing purge gas into the first conduit section while the orbital weld is created and passing at least a portion of the purge gas from the first conduit section into the second conduit section to reduce or eliminate a presence of contaminants proximate the orbital weld;

connecting a purge restrictor to the second conduit section by a slip-fit engagement without a gasket, the purge restrictor comprising a sealing end and a reducing section, and wherein the slip-fit engagement forms a substantially airtight seal between the second conduit and the purge restrictor; and flowing at least a portion of the purge gas from the second conduit into a purge restrictor, the purge restrictor comprising a sealing end and a reducing section, the sealing end being connected to the second section, the reducing section having a smaller width than that of the sealing end.

20. The method of claim 19 wherein the purge restrictor is comprised in a purge assembly, the purge assembly being substantially elongated and comprising an outflow conduit extending from the purge restrictor, the purge assembly having a length that is sufficient to prevent atmosphere from moving through the purge assembly into the second section.

21. The method of claim 20, further comprising operating a valve comprised in the purge assembly to regulate a pressure proximate an interface between the first and second conduit sections.

22. The method of claim 21 wherein the valve is operated to maintain a pressure within the conduit sections of between about 1 inch of water and about 5 inches of water while the orbital weld is created.

23. The method of claim 21 wherein the valve is a needle valve.

24. The method of claim 19 wherein the formed conduit comprises a wall thickness, and wherein the orbital weld is substantially non-contaminated and substantially fully penetrated, and wherein the orbital weld has a maximum radial length of misalignment, concavity, or convexity that is less than about 10 percent of the wall thickness.

25. The method of claim 19, further comprising regulating the pressure of purge gas within the conduit sections such that the orbital weld remains substantially uncontaminated and the orbital weld is not substantially concave or substantially convex.

26. The method of claim 19 wherein the purge gas is introduced into the conduit section at a flow rate between about 5 cubic feet per minute and about 15 cubic feet per minute.

27. The method of claim 19 wherein the orbital weld comprises an inside bead width and an outside beam width that are substantially equal.

28. The method of claim 19 wherein the second section further comprises an engaging section that contacts the sealing end, and further comprising removing the sealing end from the second section, and wherein the engaging section is substantially free of contaminating residue.

29. The method of claim 19, further comprising maintaining a pressure within the first and second conduit sections that is greater than atmospheric pressure, and wherein the pressure is maintained throughout formation of the orbital weld to inhibit atmosphere from entering the first and second conduit sections proximate the orbital weld before the orbital weld is completed.

30. The method of claim 19, further comprising distributing shield gas from the weld head into the chamber during formation of the orbital weld.

* * * * *